US008978088B2

(12) United States Patent
Nishimura et al.

(10) Patent No.: US 8,978,088 B2
(45) Date of Patent: *Mar. 10, 2015

(54) SYSTEMS AND METHODS FOR DISPLAYING MEDIA CONTENT AND MEDIA GUIDANCE INFORMATION

(71) Applicant: United Video Properties, Inc., Santa Clara, CA (US)

(72) Inventors: Akitaka Nishimura, Tokyo (JP); Akio Yoshimoto, Kanagawa (JP)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,495

(22) Filed: Oct. 7, 2013

(65) Prior Publication Data

US 2014/0068667 A1    Mar. 6, 2014

Related U.S. Application Data

(63) Continuation of application No. 12/144,434, filed on Jun. 23, 2008, now Pat. No. 8,601,526.

(60) Provisional application No. 61/061,185, filed on Jun. 13, 2008.

(51) Int. Cl.
*H04N 5/445* (2011.01)
*H04N 7/173* (2011.01)
(Continued)

(52) U.S. Cl.
CPC ..... *H04N 21/26283* (2013.01); *H04N 5/44543* (2013.01); *H04N 21/4622* (2013.01);
(Continued)

(58) Field of Classification Search
USPC ............................ 725/39, 59, 118, 141, 153
See application file for complete search history.

(56) References Cited

U.S. PATENT DOCUMENTS

| 4,429,385 A | 1/1984 | Cichelli et al. |
| 4,625,080 A | 11/1986 | Scott |

(Continued)

FOREIGN PATENT DOCUMENTS

| DE | 31 51 492 | 7/1983 |
| DE | 19 531 121 | 2/1997 |

(Continued)

OTHER PUBLICATIONS

U.S. Appl. No. 11/324,202, filed Dec. 29, 2005, Yates.

(Continued)

*Primary Examiner* — Kieu Oanh T Bui
(74) *Attorney, Agent, or Firm* — Ropes & Gray LLP

(57) ABSTRACT

A system comprises television equipment and a number of portable electronic devices. The television equipment includes a large display and control circuitry. The control circuitry receives media content and media guidance data for display on the display. The control circuitry also includes communication components for communicating with the portable electronic devices. The portable electronic devices are operable for displaying video and communicating with the television equipment. A method comprises the steps of receiving media guidance information with a first portable electronic device; transmitting at least some of the media guidance information from the first portable electronic device to the control circuitry of the television equipment; and displaying the media guidance information from the first portable electronic device on the display of the television equipment while simultaneously displaying media content or media guidance information received from a source other than the first portable electronic device.

20 Claims, 10 Drawing Sheets

(51) Int. Cl.
*H04N 7/16* (2011.01)
*H04N 21/262* (2011.01)
*H04N 21/462* (2011.01)
*H04N 21/41* (2011.01)
*H04N 21/431* (2011.01)
*H04N 21/4363* (2011.01)
*H04N 21/472* (2011.01)
*H04N 21/475* (2011.01)
*H04N 21/482* (2011.01)

(52) U.S. Cl.
CPC ....... *H04N21/4126* (2013.01); *H04N 21/4316* (2013.01); *H04N 21/43637* (2013.01); *H04N 21/472* (2013.01); *H04N 21/475* (2013.01); *H04N 21/482* (2013.01); *H04N 21/462* (2013.01)
USPC .............. 725/133; 725/39; 725/59; 725/118; 725/153

(56) References Cited

U.S. PATENT DOCUMENTS

| | | |
|---|---|---|
| 4,706,121 A | 11/1987 | Young |
| 4,751,578 A | 6/1988 | Reiter et al. |
| 4,761,684 A | 8/1988 | Clark et al. |
| 4,787,063 A | 11/1988 | Muguet |
| 4,908,707 A | 3/1990 | Kinghorn |
| 5,036,314 A | 7/1991 | Barillari et al. |
| 5,089,885 A | 2/1992 | Clark |
| 5,113,259 A | 5/1992 | Romesburg et al. |
| 5,132,992 A | 7/1992 | Yurt et al. |
| 5,155,591 A | 10/1992 | Wachob |
| 5,223,924 A | 6/1993 | Strubbe |
| 5,233,423 A | 8/1993 | Jernigan et al. |
| 5,253,066 A | 10/1993 | Vogel |
| 5,335,277 A | 8/1994 | Harvey et al. |
| 5,353,121 A | 10/1994 | Young et al. |
| 5,359,367 A | 10/1994 | Stockill |
| 5,382,983 A | 1/1995 | Kwoh et al. |
| 5,410,326 A | 4/1995 | Goldstein |
| 5,414,756 A | 5/1995 | Levine |
| 5,455,570 A | 10/1995 | Cook et al. |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,502,504 A | 3/1996 | Marshall et al. |
| 5,509,908 A | 4/1996 | Hillstead et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,550,576 A | 8/1996 | Klosterman |
| 5,557,338 A | 9/1996 | Maze et al. |
| 5,559,548 A | 9/1996 | Davis et al. |
| 5,559,549 A | 9/1996 | Hendricks et al. |
| 5,559,550 A | 9/1996 | Mankovitz |
| 5,570,295 A | 10/1996 | Isenberg et al. |
| 5,572,442 A | 11/1996 | Schulhof et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,606,374 A | 2/1997 | Bertram |
| 5,617,526 A | 4/1997 | Oran et al. |
| 5,619,249 A | 4/1997 | Billock et al. |
| 5,621,456 A | 4/1997 | Florin et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,640,484 A | 6/1997 | Mankovitz |
| 5,654,748 A | 8/1997 | Matthews, III |
| 5,657,072 A | 8/1997 | Aristides et al. |
| 5,666,293 A | 9/1997 | Metz et al. |
| 5,673,089 A | 9/1997 | Yuen et al. |
| 5,675,390 A | 10/1997 | Schindler et al. |
| 5,682,206 A | 10/1997 | Wehmeyer et al. |
| 5,692,214 A | 11/1997 | Levine |
| 5,694,163 A | 12/1997 | Harrison |
| 5,699,107 A | 12/1997 | Lawler et al. |
| 5,710,601 A | 1/1998 | Marshall et al. |
| 5,734,853 A | 3/1998 | Hendricks et al. |
| 5,734,893 A | 3/1998 | Li et al. |
| 5,748,191 A | 5/1998 | Rozak et al. |
| 5,748,716 A | 5/1998 | Levine |
| 5,758,257 A | 5/1998 | Herz et al. |
| 5,758,259 A | 5/1998 | Lawler |
| 5,781,246 A | 7/1998 | Alten et al. |
| 5,787,259 A | 7/1998 | Haroun et al. |
| 5,788,507 A | 8/1998 | Redford et al. |
| 5,790,202 A | 8/1998 | Kummer et al. |
| 5,793,964 A | 8/1998 | Rogers et al. |
| 5,798,785 A | 8/1998 | Hendricks et al. |
| 5,812,931 A | 9/1998 | Yuen |
| 5,828,420 A | 10/1998 | Marshall et al. |
| 5,844,620 A | 12/1998 | Coleman et al. |
| 5,850,218 A | 12/1998 | LaJoie et al. |
| 5,858,866 A | 1/1999 | Berry et al. |
| 5,867,233 A | 2/1999 | Tanaka |
| 5,880,768 A | 3/1999 | Lemmons et al. |
| 5,886,732 A | 3/1999 | Humpleman |
| 5,886,746 A | 3/1999 | Yuen et al. |
| 5,907,323 A | 5/1999 | Lawler et al. |
| 5,914,746 A | 6/1999 | Matthews, III et al. |
| 5,977,964 A | 11/1999 | Williams et al. |
| 5,986,650 A | 11/1999 | Ellis et al. |
| 5,988,078 A | 11/1999 | Levine |
| 6,002,394 A | 12/1999 | Schein et al. |
| 6,014,184 A | 1/2000 | Knee et al. |
| 6,016,141 A | 1/2000 | Knudson et al. |
| 6,097,441 A | 8/2000 | Allport |
| 6,104,334 A | 8/2000 | Allport |
| 6,130,726 A | 10/2000 | Darbee et al. |
| 6,169,543 B1 | 1/2001 | Wehmeyer |
| 6,177,931 B1 | 1/2001 | Alexander et al. |
| 6,208,384 B1 | 3/2001 | Schultheiss |
| 6,226,444 B1 | 5/2001 | Goldschmidt Iki et al. |
| 6,226,618 B1 | 5/2001 | Downs et al. |
| 6,233,734 B1 | 5/2001 | Macrae et al. |
| 6,239,794 B1 | 5/2001 | Yuen et al. |
| 6,263,501 B1 | 7/2001 | Schein et al. |
| 6,263,503 B1 | 7/2001 | Margulis |
| 6,268,849 B1 | 7/2001 | Boyer et al. |
| 6,310,886 B1 | 10/2001 | Barton |
| 6,324,338 B1 | 11/2001 | Wood et al. |
| 6,331,877 B1 | 12/2001 | Bennington et al. |
| 6,354,378 B1 | 3/2002 | Patel |
| 6,357,043 B1 | 3/2002 | Ellis et al. |
| 6,418,556 B1 | 7/2002 | Bennington et al. |
| 6,463,585 B1 | 10/2002 | Hendricks et al. |
| 6,522,342 B1 | 2/2003 | Gagnon et al. |
| 6,536,041 B1 | 3/2003 | Knudson et al. |
| 6,564,378 B1 | 5/2003 | Satterfield et al. |
| 6,611,654 B1 | 8/2003 | Shteyn |
| 6,614,987 B1 | 9/2003 | Ismail et al. |
| 6,651,253 B2 | 11/2003 | Dudkiewicz et al. |
| 6,756,997 B1 | 6/2004 | Ward, III et al. |
| 6,760,412 B1 | 7/2004 | Loucks |
| 6,760,537 B2 | 7/2004 | Mankovitz |
| 6,813,775 B1 | 11/2004 | Finseth et al. |
| 6,813,777 B1 | 11/2004 | Weinberger et al. |
| 6,837,789 B2 | 1/2005 | Garahi et al. |

(56) References Cited

U.S. PATENT DOCUMENTS

| | | |
|---|---|---|
| 6,868,225 B1 | 3/2005 | Brown et al. |
| 6,897,904 B2 | 5/2005 | Potrebic et al. |
| 6,950,624 B2 | 9/2005 | Kim et al. |
| 7,003,791 B2 | 2/2006 | Mizutani |
| 7,013,478 B1 | 3/2006 | Hendricks et al. |
| 7,020,704 B1 | 3/2006 | Lipscomb et al. |
| 7,055,166 B1 | 5/2006 | Logan et al. |
| 7,088,952 B1 | 8/2006 | Saito et al. |
| 7,134,130 B1 | 11/2006 | Thomas |
| 7,165,098 B1 | 1/2007 | Boyer et al. |
| 7,200,852 B1 | 4/2007 | Block |
| 7,206,892 B2 | 4/2007 | Kim et al. |
| 7,213,089 B2 | 5/2007 | Hatakenaka |
| 7,224,889 B2 | 5/2007 | Takasu et al. |
| 7,268,833 B2 | 9/2007 | Park et al. |
| 7,296,284 B1 | 11/2007 | Price et al. |
| 7,344,084 B2 | 3/2008 | DaCosta |
| 7,386,871 B1 | 6/2008 | Knudson et al. |
| 7,428,744 B1 | 9/2008 | Ritter et al. |
| 7,458,093 B2 | 11/2008 | Dukes et al. |
| 7,518,503 B2 | 4/2009 | Peele |
| 7,603,685 B2 | 10/2009 | Knudson et al. |
| 7,689,556 B2 | 3/2010 | Garg et al. |
| 7,783,632 B2 | 8/2010 | Richardson et al. |
| 7,852,416 B2 | 12/2010 | Bennett et al. |
| 8,060,399 B2 | 11/2011 | Ullah |
| 8,104,066 B2 | 1/2012 | Colsey et al. |
| 8,122,491 B2 | 2/2012 | Yee et al. |
| 8,266,666 B2 | 9/2012 | Friedman |
| 8,331,987 B2 | 12/2012 | Rosenblatt |
| 8,601,526 B2 * | 12/2013 | Nishimura et al. ........... 725/133 |
| 2002/0032907 A1 | 3/2002 | Daniels |
| 2002/0056087 A1 | 5/2002 | Berezowski et al. |
| 2002/0056119 A1 | 5/2002 | Moynihan |
| 2002/0059610 A1 | 5/2002 | Ellis |
| 2002/0075402 A1 | 6/2002 | Robson et al. |
| 2002/0078453 A1 | 6/2002 | Kuo |
| 2002/0090203 A1 | 7/2002 | Mankovitz |
| 2002/0157099 A1 | 10/2002 | Schrader et al. |
| 2002/0165751 A1 | 11/2002 | Upadhya |
| 2002/0165770 A1 | 11/2002 | Khoo et al. |
| 2002/0174430 A1 | 11/2002 | Ellis et al. |
| 2002/0194586 A1 | 12/2002 | Gutta et al. |
| 2002/0194600 A1 | 12/2002 | Ellis et al. |
| 2003/0005440 A1 | 1/2003 | Axelsson et al. |
| 2003/0026592 A1 | 2/2003 | Kawahara et al. |
| 2003/0066085 A1 | 4/2003 | Boyer et al. |
| 2003/0070177 A1 | 4/2003 | Kondo et al. |
| 2003/0093803 A1 | 5/2003 | Ishikawa et al. |
| 2003/0110499 A1 | 6/2003 | Knudson et al. |
| 2003/0140343 A1 | 7/2003 | Falvo et al. |
| 2003/0149621 A1 | 8/2003 | Shteyn |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2003/0237093 A1 | 12/2003 | Marsh |
| 2004/0064835 A1 | 4/2004 | Bellwood et al. |
| 2004/0070491 A1 | 4/2004 | Huang et al. |
| 2004/0104806 A1 | 6/2004 | Yui et al. |
| 2004/0268403 A1 | 12/2004 | Krieger et al. |
| 2005/0149966 A1 | 7/2005 | Fairhurst et al. |
| 2005/0246746 A1 | 11/2005 | Yui et al. |
| 2006/0007479 A1 | 1/2006 | Henry et al. |
| 2006/0026635 A1 | 2/2006 | Potrebic et al. |
| 2006/0026665 A1 | 2/2006 | Rodriguez et al. |
| 2006/0031883 A1 | 2/2006 | Ellis et al. |
| 2006/0053449 A1 | 3/2006 | Gutta |
| 2006/0098221 A1 | 5/2006 | Ferlitsch |
| 2006/0101492 A1 | 5/2006 | Lowcock |
| 2006/0190978 A1 | 8/2006 | Russ et al. |
| 2006/0218573 A1 | 9/2006 | Proebstel |
| 2006/0218604 A1 | 9/2006 | Riedl et al. |
| 2006/0253874 A1 | 11/2006 | Stark et al. |
| 2006/0263758 A1 | 11/2006 | Crutchfield, et al. |
| 2006/0265427 A1 | 11/2006 | Cohen et al. |
| 2006/0277579 A1 | 12/2006 | Inkinen |
| 2006/0294574 A1 | 12/2006 | Cha |
| 2007/0033607 A1 | 2/2007 | Bryan |
| 2007/0036303 A1 | 2/2007 | Lee et al. |
| 2007/0055989 A1 | 3/2007 | Shanks et al. |
| 2007/0074245 A1 | 3/2007 | Nyako et al. |
| 2007/0076665 A1 | 4/2007 | Nair et al. |
| 2007/0089132 A1 | 4/2007 | Qureshey et al. |
| 2007/0130089 A1 | 6/2007 | Chiu |
| 2007/0130283 A1 | 6/2007 | Klein et al. |
| 2007/0157240 A1 | 7/2007 | Walker |
| 2007/0161402 A1 | 7/2007 | Ng. et al. |
| 2007/0162850 A1 | 7/2007 | Adler et al. |
| 2007/0186240 A1 | 8/2007 | Ward et al. |
| 2007/0214489 A1 | 9/2007 | Kwong et al. |
| 2007/0283395 A1 | 12/2007 | Wezowski |
| 2008/0046930 A1 | 2/2008 | Smith et al. |
| 2008/0046935 A1 | 2/2008 | Krakirian |
| 2008/0059988 A1 | 3/2008 | Lee et al. |
| 2008/0074546 A1 | 3/2008 | Momen |
| 2008/0077965 A1 | 3/2008 | Kamimaki et al. |
| 2008/0120668 A1 | 5/2008 | Yau |
| 2008/0127253 A1 | 5/2008 | Zhang et al. |
| 2008/0134256 A1 | 6/2008 | DaCosta |
| 2008/0155585 A1 | 6/2008 | Craner et al. |
| 2008/0184294 A1 | 7/2008 | Lemmons et al. |
| 2008/0196068 A1 | 8/2008 | Tseng |
| 2008/0282288 A1 | 11/2008 | Heo |
| 2008/0300985 A1 | 12/2008 | Shamp et al. |
| 2008/0301729 A1 | 12/2008 | Broos et al. |
| 2009/0052859 A1 | 2/2009 | Greenberger et al. |
| 2009/0087039 A1 | 4/2009 | Matsuura |
| 2009/0125971 A1 | 5/2009 | Belz et al. |
| 2009/0150925 A1 | 6/2009 | Henderson |
| 2009/0165046 A1 | 6/2009 | Stallings et al. |
| 2009/0174658 A1 | 7/2009 | Blatchley et al. |
| 2009/0183208 A1 | 7/2009 | Christensen et al. |
| 2009/0210898 A1 | 8/2009 | Childress et al. |
| 2009/0217335 A1 | 8/2009 | Wong et al. |
| 2009/0249391 A1 | 10/2009 | Klein et al. |
| 2009/0271829 A1 | 10/2009 | Larsson et al. |
| 2009/0288131 A1 | 11/2009 | Kandekar et al. |
| 2009/0288132 A1 | 11/2009 | Hegde |
| 2009/0292671 A1 | 11/2009 | Ramig et al. |
| 2009/0298535 A1 | 12/2009 | Klein et al. |
| 2009/0313658 A1 * | 12/2009 | Nishimura et al. ............. 725/59 |
| 2010/0053458 A1 | 3/2010 | Anglin et al. |
| 2010/0107046 A1 | 4/2010 | Kang et al. |
| 2010/0107194 A1 | 4/2010 | Mckissick et al. |
| 2010/0146445 A1 | 6/2010 | Kraut |
| 2010/0146560 A1 | 6/2010 | Bonfrer |
| 2010/0146573 A1 | 6/2010 | Richardson et al. |
| 2010/0154021 A1 | 6/2010 | Howarter et al. |
| 2010/0169072 A1 | 7/2010 | Zaki et al. |
| 2010/0199313 A1 | 8/2010 | Rhim |
| 2010/0262987 A1 | 10/2010 | Imanilov |
| 2010/0310234 A1 | 12/2010 | Sigvaldason |
| 2011/0029922 A1 | 2/2011 | Hoffberg et al. |
| 2011/0069940 A1 | 3/2011 | Shimy et al. |
| 2011/0070819 A1 | 3/2011 | Shimy et al. |
| 2011/0072452 A1 | 3/2011 | Shimy et al. |
| 2011/0078731 A1 | 3/2011 | Nishimura |
| 2011/0107388 A1 | 5/2011 | Lee et al. |
| 2011/0134320 A1 | 6/2011 | Daly |
| 2011/0163939 A1 | 7/2011 | Tam et al. |
| 2011/0164175 A1 | 7/2011 | Chung et al. |
| 2011/0167447 A1 | 7/2011 | Wong |
| 2011/0258211 A1 | 10/2011 | Kalisky et al. |
| 2012/0072964 A1 | 3/2012 | Walter et al. |
| 2013/0047189 A1 | 2/2013 | Raveendran et al. |
| 2013/0191875 A1 | 7/2013 | Morris et al. |

FOREIGN PATENT DOCUMENTS

| | | |
|---|---|---|
| DE | 19 740 079 | 3/1999 |
| EP | 0 774 853 | 5/1997 |

(56) References Cited

FOREIGN PATENT DOCUMENTS

| | | |
|---|---|---|
| EP | 0 793 225 | 9/1997 |
| EP | 0805594 | 11/1997 |
| EP | 1363452 | 11/2003 |
| EP | 2129113 | 12/2009 |
| EP | 2154882 | 2/2010 |
| EP | 2299711 | 3/2011 |
| GB | 2265792 | 10/1993 |
| GB | 2458727 | 10/2009 |
| JP | 03-022770 | 1/1991 |
| JP | 6-101261 | 4/1994 |
| JP | 8-56352 | 2/1996 |
| JP | 09-102827 | 4/1997 |
| JP | 2004-304372 A | 10/2004 |
| JP | 2009-081877 A | 4/2009 |
| JP | 2009-111817 A | 5/2009 |
| WO | WO-8737661 | 6/1987 |
| WO | WO-8930851 | 4/1989 |
| WO | WO-9414284 | 6/1994 |
| WO | WO-9510561 | 1/1995 |
| WO | WO-9510591 | 1/1995 |
| WO | WO-9510910 | 4/1995 |
| WO | WO-9528055 | 10/1995 |
| WO | WO-9532585 | 11/1995 |
| WO | WO-9607270 | 3/1996 |
| WO | WO-9613932 | 5/1996 |
| WO | WO-9620555 | 7/1996 |
| WO | WO-9713368 | 4/1997 |
| WO | WO-9731480 | 8/1997 |
| WO | WO-9736422 | 10/1997 |
| WO | WO-9747106 | 12/1997 |
| WO | WO-9747143 | 12/1997 |
| WO | WO-9749237 | 12/1997 |
| WO | WO-9750251 | 12/1997 |
| WO | WO-9810589 | 3/1998 |
| WO | WO-9816062 | 4/1998 |
| WO | WO-9817064 | 4/1998 |
| WO | WO-9826584 | 6/1998 |
| WO | WO-9914947 | 3/1999 |
| WO | WO-9930491 | 6/1999 |
| WO | WO-0033576 | 6/2000 |
| WO | WO-01/91460 A2 | 11/2001 |
| WO | WO-0191458 | 11/2001 |
| WO | WO-2004/023810 A1 | 3/2004 |
| WO | WO-2007036891 | 4/2007 |
| WO | WO-2008042267 | 4/2008 |
| WO | WO-2009067670 | 5/2009 |
| WO | WO-2009148056 | 12/2009 |
| WO | WO-2011037761 | 3/2011 |
| WO | WO-2011084950 | 7/2011 |

OTHER PUBLICATIONS

"Honey, is there anything good on the remote tonight?", advertisement from Multichannel News, Broadband Week Section, Nov. 30, 1998, p. 168.

"*How Evolve Works*," from the Internet at http://www.evolveproducts.com/network.html, printed on Dec. 28, 1998.

"Jini Architecture Overview," by Jim Waldo, from the Internet at http://Java.sun.com/products/jini/whitepapers/architectureoverview.pdf/ printed on Jan. 25, 1999. The document bears a copyright date of 1998.

"*Reaching your subscribers is a complex and costly process—until now*," from the Internet at http://www.evolveproducts.com/info.html, printed on Dec. 28, 1998.

"Sun's Next Steps in Digital Set-Tops," article in Cablevision, Nov. 16, 1998, p. 56.

"The Evolve EZ Guide. The Remote Control," from the Internet at http://www.evolveproducts.com/display2.html, printed on Dec. 28, 1998.

"*Using StarSight 2*," published before Apr. 19, 1995.

"*What is Jini?*", from the Internet at http://java.sun.com/products/jini/whitepapers/whatsiini.pdf, printed on Jan. 25, 1999.

"*Why Jini Now?*", from the internet at http://java.sun.com/products/jini/whitepapers/whyjininow.pdf, printed on Jan. 25, 1999. The document bears a copyright date of 1998.

Darrow, A. et al., "Design Guidelines for Technology-Mediated Social Interaction in a Presence Sensing Physical Space," Carnegie Mellon University Research Showcase, Carnegie Institute of Technology, Jan. 1, 2007, pp. 1-9.

Eitz, Gerhard, "Zukunftige Informations-Und Datenangebote Beim Digitalen Fernsehen—EPG Und Lesezeichen," Rundfunktechnische Mitteilungen, vol. 41, pp. 67-72, Apr. 30, 1997. (English language translation attached.).

Index Systems Inc., "Gemstar Service Object Model," Data Format Specification, Ver. 2.0.4, pp. 58-59.

Jaidev, "EXSLT—A Wired and Wireless Case Study," http://csharpcomputing.com/XMLTutorial/Lession15.htm.

Neumann, Andreas, "WDR Online Aufbau Und Perspektiven Automatisierter Online-Dienste Im WDR," Rundfunktechnische Mitteilungen, vol. 41, Jan. 21, 1997, pp. 56-66. (English language translation attached.).

Papers Delivered (Part1), 61st National Conference, Information Processing Society of Japan, Oct. 3-5, 2000.

Pogue, D., "State of the Art: for TiVo and Replay, New Reach," N.Y. Times, May 29, 2003.

Randerson, J., "Let Software Catch the Game for You," New Scientist, Jul. 3, 2004.

Rogers, Curt, "Telcos vs. Cable TV: The Global View," Data Communications, No. 13, New York, Sep. 1995, pp. 75, 76, 78 and 80.

\* cited by examiner

SYSTEMS AND METHODS FOR DISPLAYING MEDIA CONTENT AND MEDIA GUIDANCE INFORMATION

CROSS-REFERENCE TO RELATED APPLICATIONS

This application is a continuation of patent application Ser. No. 12/144,434, filed Jun. 23, 2008, now allowed, and claims the benefit of U.S. Provisional Application No. 61/061,185, filed Jun. 13, 2008. The contents of each of these disclosures is hereby incorporated by reference herein in their entirety.

BACKGROUND OF THE INVENTION

Embodiments of the invention relate generally to media systems and methods, and more particularly, to media systems and methods for displaying media content and media guidance information received by portable electronic devices.

The amount and variety of media content available to users has increased dramatically in recent years. In addition to hundreds of conventional broadcast television channels, users may now access a nearly limitless amount of video, audio, and other content. Moreover, with the advent of the Internet, mobile computing, and high-speed wireless networks, users are accessing media content on devices on which they traditionally did not, such as mobile phones, personal computers, hand-held computers, personal digital assistants (PDAs), or other portable electronic devices. For example, it is now common to equip mobile phones with digital receivers for receiving and displaying television programs and other media content broadcast by terrestrial broadcasting services.

Interactive media guidance applications have been developed to assist users in navigating through the wide array of media content accessible by televisions, mobile phones, and other equipment. An interactive media guidance application may also perform media guidance application functions on content accessible by a user's equipment. These media guidance application functions may include searching for desired content, scheduling a selected content to be recorded, recording the selected content to a local storage device or remote media server, adding the selected content to a favorite programs list, setting a reminder for the selected content, ordering the selected content via an on-demand (e.g., video on-demand or VOD) or pay-per-view (PPV) service, or any other suitable function.

Although interactive media guidance applications are relatively easy to use with televisions and computer monitors, they are less so with mobile phones and other portable electronic devices because the display screens on such devices are typically too small to display much of the media guidance data provided by the guidance applications.

Similarly, while many users enjoy the portability and convenience of watching media content via their mobile phones and other portable electronic devices, they sometimes have difficulty viewing some types of media content because of the small display screens.

SUMMARY OF THE INVENTION

Embodiments of the present invention solve the above-described problems and provide enhanced systems and methods for displaying media content and media guidance information received by portable electronic devices.

Embodiments of the invention may be implemented with a system comprising television equipment and a number of portable electronic devices. The television equipment may include a display, control circuitry, and possibly other equipment such as a DVD player or digital recorder. The control circuitry may be contained within a set-top box, an integrated receiver decoder (IRD), the display itself, or other similar component and receives media content and media guidance data for display on the display. The control circuitry also includes communication components for communicating with the portable electronic devices. The display is preferably a large-screen television but may be any type of monitor, liquid crystal display (LCD), or other suitable device for displaying video.

The portable electronic devices may be mobile phones, portable computers, portable game players, portable televisions, portable navigation devices, personal digital assistants, or any other type of portable electronic device capable of displaying video and communicating with other devices as described herein. The portable electronic devices are operable for wirelessly receiving and displaying media content and media guidance information and for communicating with the above-described television equipment.

Embodiments of the invention permit users to display media guidance data for their portable electronic devices on the relatively larger display of the television equipment so the data can be more easily viewed and/or used. The display may be divided into segments so that users of multiple portable electronic devices may simultaneously display their media guidance data on different segments or areas of the display. This permits members of a family or other group to watch media content on their personal electronic devices while occasionally transmitting media guidance data and/or media content to the television equipment for display on the shared large display.

Embodiments of the invention also permit portable electronic device users to edit, use, or otherwise manipulate their media guidance information while it is displayed on the large display. The edited or otherwise altered media guidance information may then be transmitted back to the portable electronic devices for use and/or display.

Embodiments of the invention also permit users to share media guidance data among several portable electronic devices; watch a media content on the display while listening to it via a portable electronic device; and play electronic games on the display while other users watch media content on the display.

An exemplary method of the invention comprises the steps of receiving media guidance information with a first portable electronic device; transmitting at least some of the media guidance information from the first portable electronic device to control circuitry of television equipment; and displaying the media guidance information from the first portable electronic device on the display of the television equipment while simultaneously displaying media content or media guidance information received from a source other than the first portable electronic device. For example, media guidance information received from a second portable electronic device or media guidance information for the television equipment itself may be simultaneously displayed alongside the media guidance information for the first portable electronic device.

These and other important aspects of the present invention are described more fully in the detailed description below.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
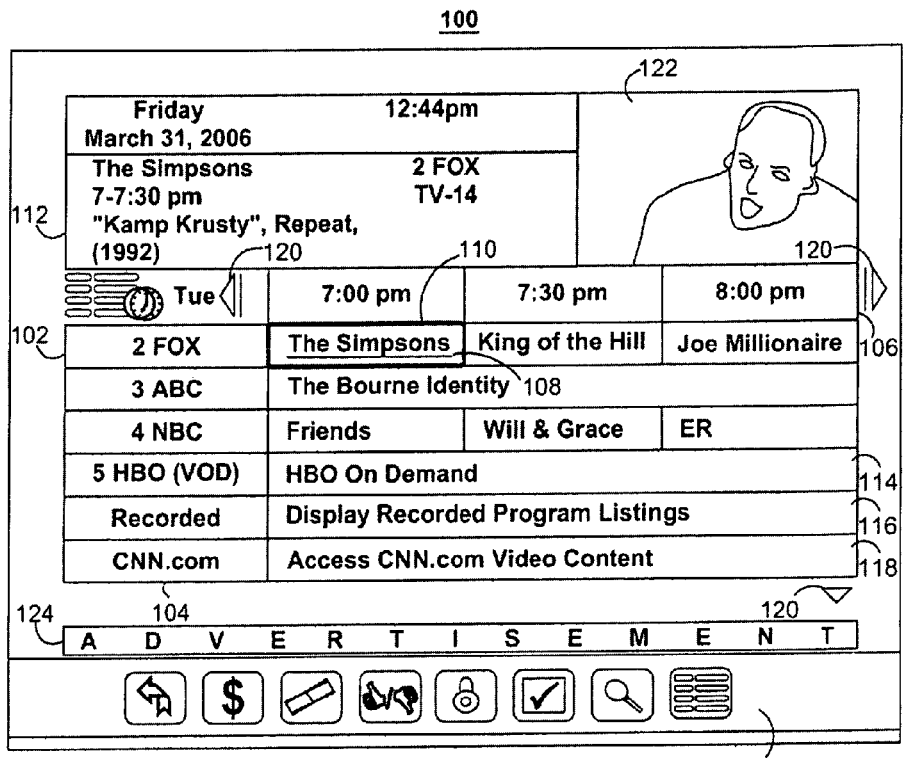
FIG. 1 shows an illustrative display screen that may be used to provide media guidance application listings and other media guidance information in accordance with an embodiment of the invention.

The amount of media content available to users in any given media delivery system can be substantial. Consequently, many users desire a form of media guidance through an interface that allows users to efficiently navigate media selections and easily identify media content that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on devices on which they traditionally did not, such as personal computers, hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

One of the functions of the media guidance application is to provide media listings and media information to users. FIGS. 1, 2, and 7-9 show illustrative display screens that may be used to provide media guidance data or information, and in particular, media listings. The display screens shown in FIGS. 1, 2, and 7-9 may be implemented on any suitable device or platform. The display screens may be full screen displays or may be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179, 410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Figure 2:
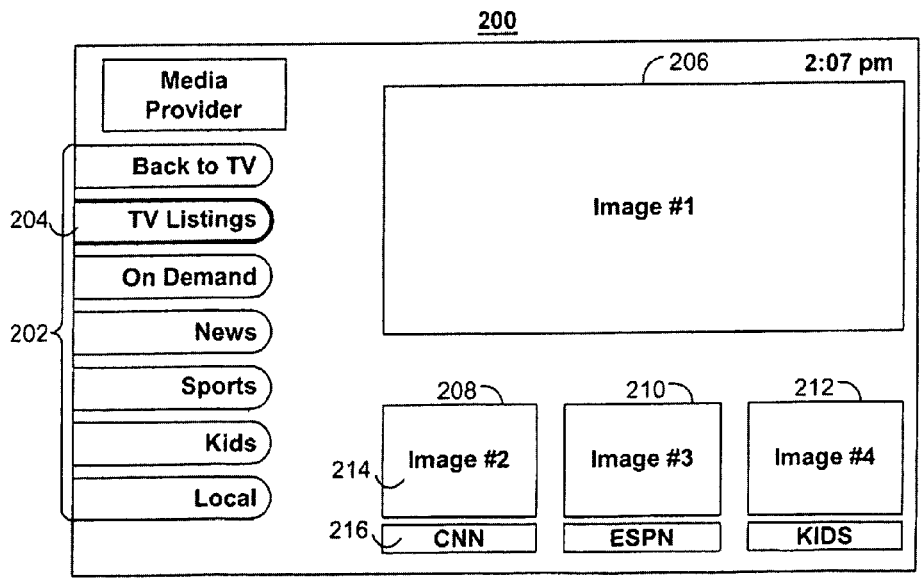
FIG. 2 shows another illustrative display screen that may be used to provide media guidance application listings in accordance with an embodiment of the invention.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Users may access media content and the media guidance application (and its display screens described above and below) from one or more of their user equipment devices. The user equipment devices may be personal computers, televisions, television-equipped mobile phones, or any other devices. For example, one user equipment device may be a personal computer provided with a tuner card that allows TV signals to be displayed on the computer monitor. The user equipment device may also be television equipment with a set-top box or receiver that permits access to the Internet via a cable connection phone line, or other communication line. The user equipment may also be a mobile phone equipped with a 1 seg tuner or other device that permits receipt of media content and media guidance data.

Figure 3:
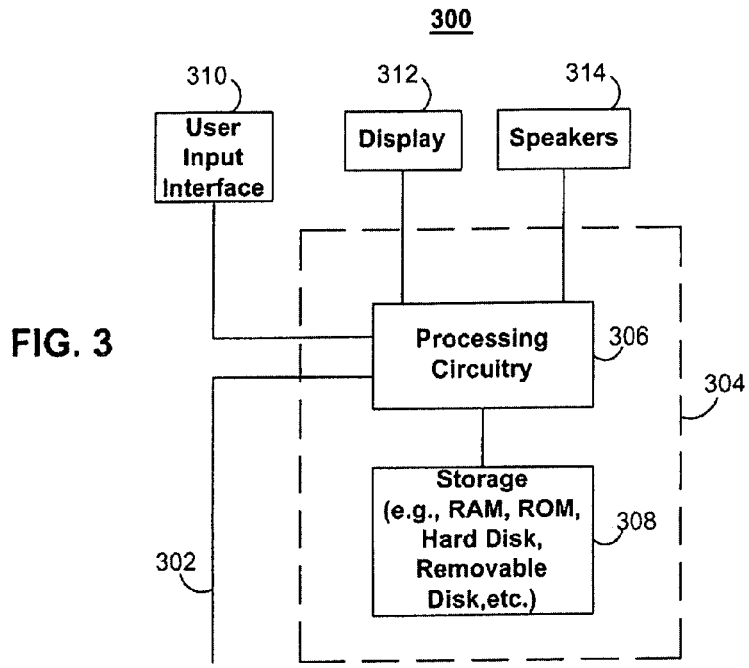
FIG. 3 is a block diagram of an illustrative user equipment device in accordance with an embodiment of the invention.

FIG. 3 shows a generalized embodiment of illustrative user equipment device 300. More specific implementations of user equipment devices are discussed below in connection with FIGS. 4-5. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
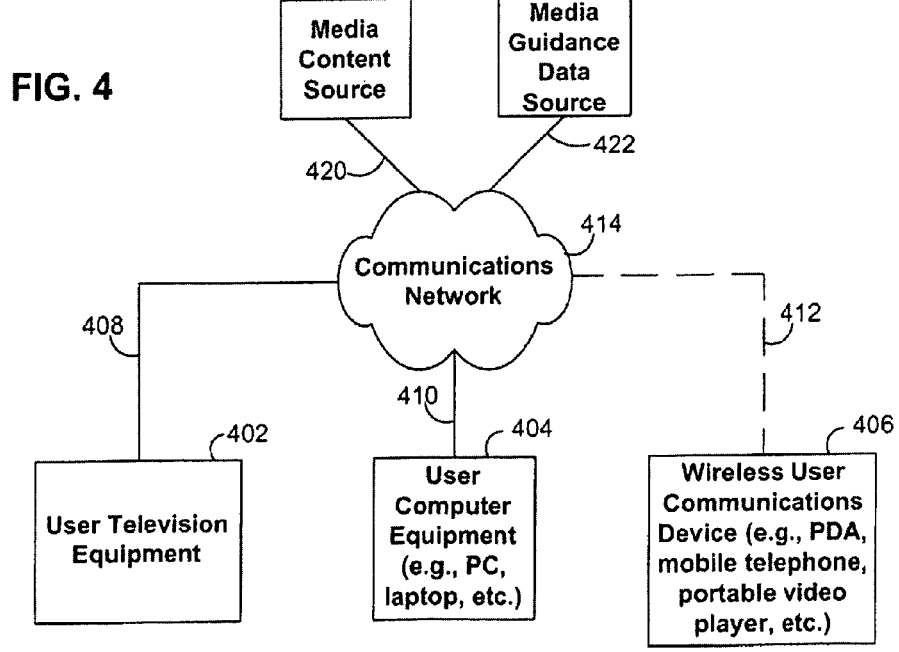
FIG. 4 is a block diagram of an illustrative interactive media system in accordance with an embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a trademark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 414.

System 400 includes media content source 416 and media guidance data source 418 coupled to communications network 414 via communication paths 120 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one or two source devices. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

Figure 5:
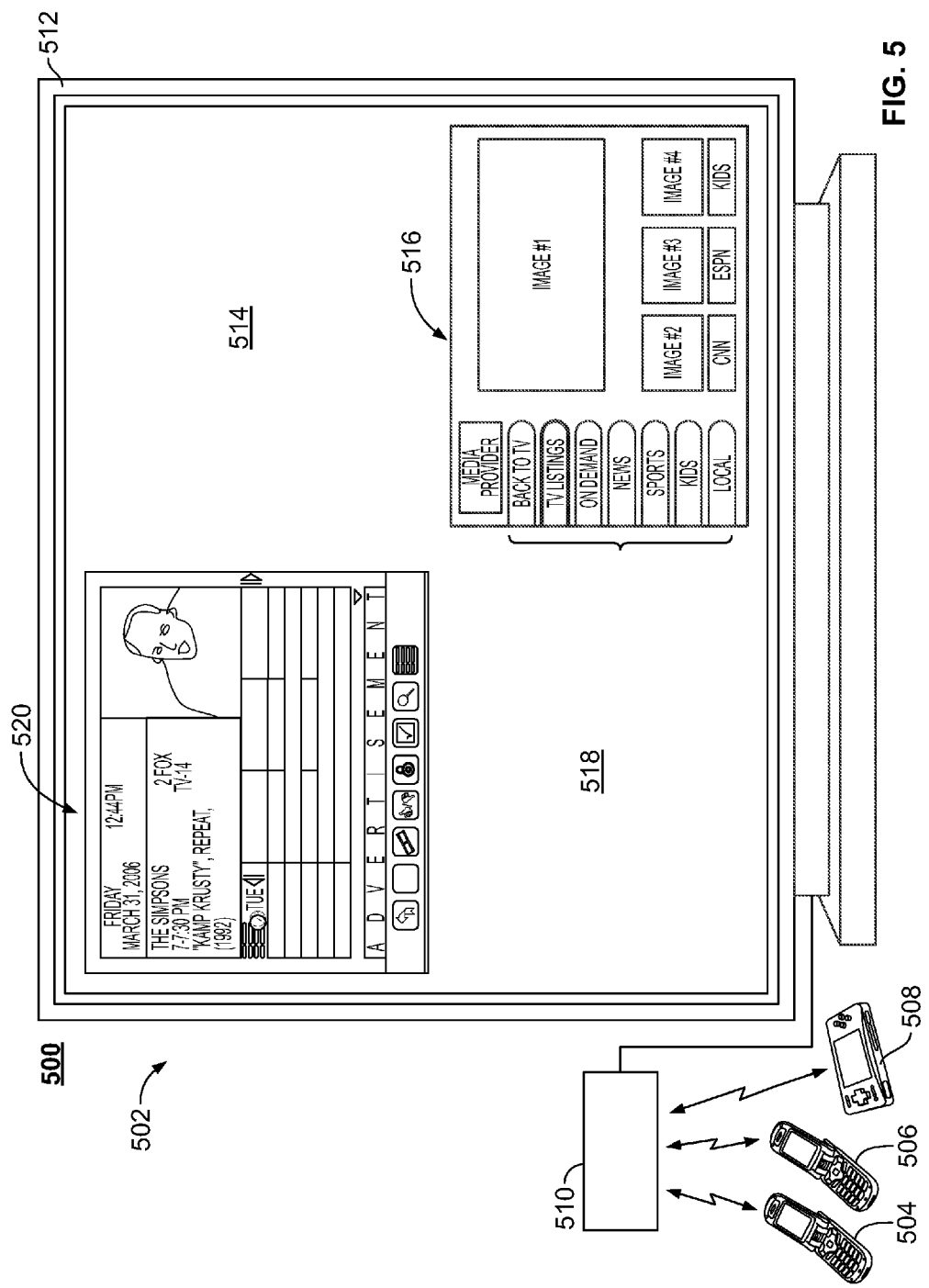
FIG. 5 is a schematic diagram of an illustrative media system for displaying media guidance information in accordance with an embodiment of the invention.

FIG. 5 illustrates another exemplary system 500 that may be used to implement embodiments of the invention. System 500 may include television equipment 502 and several portable electronic devices 504, 506, 508. As described in more detail below, media content, media guidance information, and other information may be received by one of the portable electronic devices 504-508 and then transmitted to the television equipment 502 for display.

An embodiment of the television equipment 502 may include control circuitry 510, a display 512, and possibly other equipment such as a DVD player or digital recorder. The control circuitry 510 receives media content from a source such as media content source 416 shown in FIG. 4 and media guidance data from a source such as media guidance data source 418 shown in FIG. 4. The control circuitry 510 may be the same as the control circuitry 304 described above and may be contained within a set-top box, an integrated receiver decoder (IRD), or other similar component. In some embodiments, the control circuitry 510 may be incorporated in the display 512.

The display 512 is coupled with the control circuitry for displaying media content, media guidance data, and other information and data. The display may be a large-screen television or any other type of monitor, liquid crystal display (LCD), or other suitable device for displaying video. The display may include integral speakers or be coupled with external speakers.

The portable electronic devices 504, 506, 508 may be mobile phones, portable computers, portable game players, portable televisions, portable navigation devices, personal digital assistants, or any other type of portable electronic device capable of displaying video and communicating with other devices as described herein.

Figure 6:
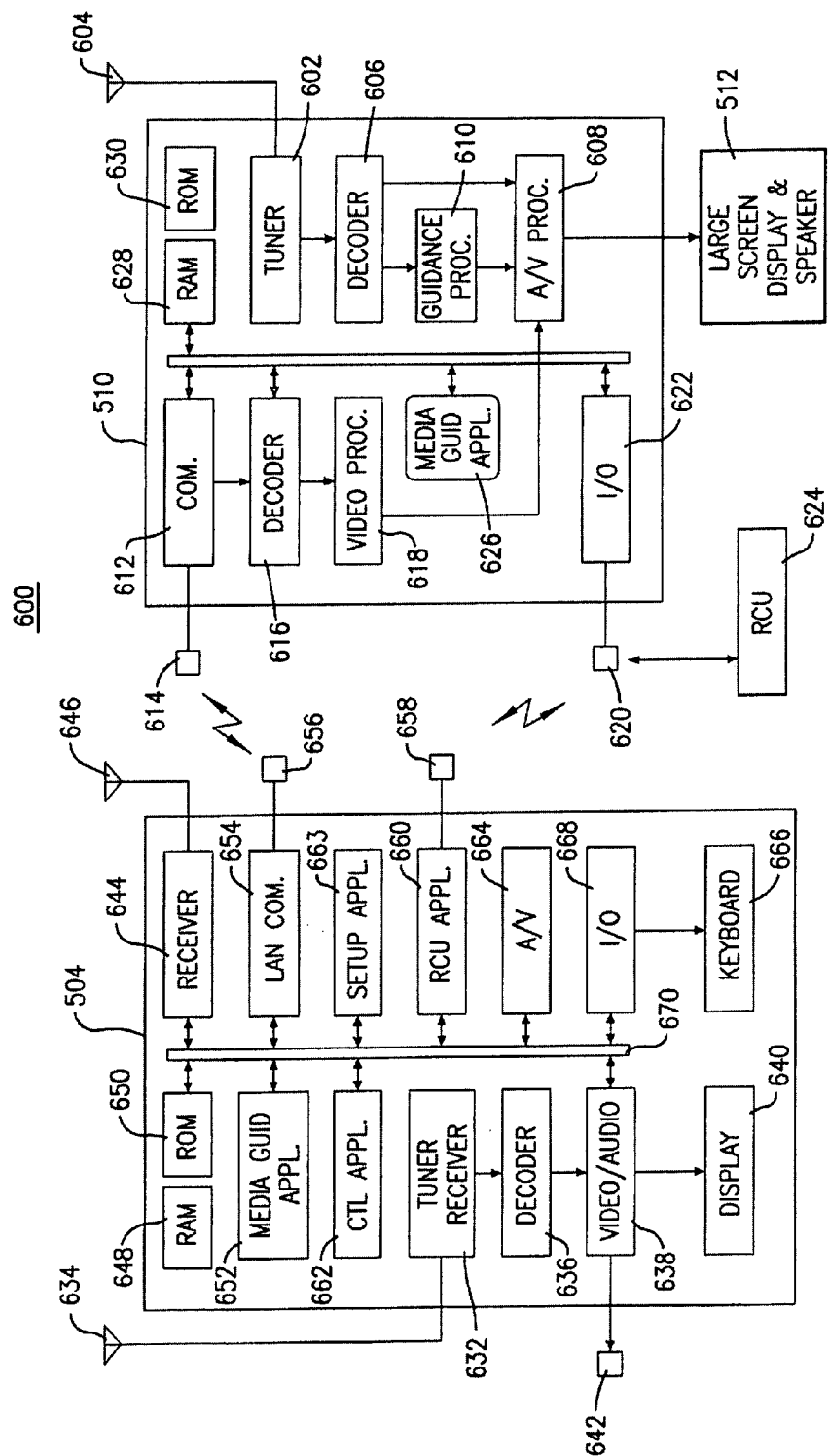
FIG. 6 is a block diagram of selected components of an exemplary portable electronic device and an exemplary control circuitry that may be used to implement embodiments of the present invention.

FIG. 6 illustrates selected components of the control circuitry 510 and one of the portable electronic devices 504 in more detail. The illustrated control circuitry 510 is a part of an integrated receiver decoder (IRD) for receiving UHF signals from a terrestrial digital broadcasting service or satellite signals from a satellite media content provider. As mentioned above, the control circuitry 510 may also be incorporated in a cable TV set-top box, the display 512, or any other device capable of receiving media content and media guidance data.

The exemplary control circuitry 510 illustrated in FIG. 6 includes a tuner 602 connected to a receiving antenna 604 for receiving UHF or satellite signals from a broadcasting source. The tuner 602 may be a digital tuner configured for receiving terrestrial digital broadcast signals such as a 12 seg receiver. Media guidance data may be embedded in the transport layer of broadcast media content signals or may be provided in separate signals. The tuner 602 delivers the signals to a decoder 606, which decodes the signals and sends the audio/video portions to an A/V processor 608 and media guidance data portions to a media guidance data processor 610. The A/V processor 608 processes the audio/video signals and delivers them to the display 512 and associated speakers. The media guidance data processor 610 processes the media guidance data signals and sends them to the A/V processor 608 for displaying corresponding media content listings or other data on the display 512.

The exemplary control circuitry 510 also includes a communication component 612 and antenna 614 for communicating with the portable electronic device 504. In an exemplary embodiment, the communication component 612 enables short-range point-to-point communications with USB cables, IEEE 1394 cables, Bluetooth® wireless protocols, infrared techniques, IEEE 802.11x LAN methods, or any other wired or wireless communication methods.

The control circuitry 510 also includes a decoder 616 for decoding data received at communication component 612 and a video processor 618 for transferring video signals received from the personal electronic device 504 to the A/V processor 608.

The control circuitry 510 may also include an infrared port 620 or other communication port and input/output interface 622 for receiving control instructions from a remote control unit 624 such as a television remote control. Finally, the control circuitry 510 may also include media guidance application software 626, RAM 628, and ROM 630.

The exemplary portable electronic device 504 shown in FIG. 6 is a television-enabled mobile phone. The device may include a digital tuner/receiver 632 such as a 1 seg tuner or similar device that receives terrestrial digital broadcasting signals through an antenna 634. The signals are then decoded by a decoder 636 which transfers audio/video portions of the signals to an A/V processor 638 which in turn delivers them to a display 640 and speakers or earphones 642. The device 504 may also include another receiver 644 such as a modem and an associated antenna 646 for communicating with a media guidance data source for receiving media guidance data. In an alternate embodiment, the functions of the tuner/receiver 632 and modem/receiver 644 may be performed by a single receiver that receives media content and media guidance data over a common signal.

The device 504 may also include RAM 648 and ROM 650 for storing the received media guidance data and other data. The device 504 may also include media guidance application software 652 designed for displaying media guidance data on small mobile electronic devices. The software is configured to display media content listings and other media guidance data on the screen of the device and to permit a user to perform selected media guidance application functions with the media guidance data. The media guidance application functions may be the same as, or a subset of, the media guidance application functions described above.

The device 504 also includes a communication device 654 and antenna 656 for communicating with the control circuitry 510. In an exemplary embodiment, the communication device 654 and antenna 656 enable short-range point-to-point communications with USB cables, IEEE 1394 cables, Bluetooth® wireless protocols, infrared techniques, IEEE 802.11x LAN methods, or any other wired or wireless communication methods.

The device 504 may also include an infrared port 658 and remote control unit (RCU) software 660 that enables the device to remotely control the television equipment 502. The device 504 may also include control application software 662 for operation control, set-up application software 663 for set-up control, an audio/video application software 664 for audio/video output format selection or adjustment, a keyboard 666 for input/output operation I/O application software 668 necessary for input and output interface, and a common control bus 670.

The above-described system 500 or other similar equipment or devices may be used to provide improved methods of displaying media content, media guidance information, and/or other information. In one example, an owner or user of portable electronic device 504 or any other portable electronic device may first enter and store certain user profile information into the device. For example, the user may type or otherwise enter his or her name, nickname, age, gender, address, hobbies, habits, favorite sports, favorite TV programs, and other identification and/or preference data with the keyboard 666 or other input device. This information may then be stored as user information in the ROM 650 or other memory. The user profile information may instead be entered into the television equipment 502 or other device and then transmitted to the portable electronic device via the components 644 or 654.

The portable electronic device 504 may then be used to receive and watch media content such as television programs via the tuner/receiver 632. To allow the user to more easily locate desired media content and perform desired media functions, media guidance data and other information may also be downloaded to the portable electronic device. Such media guidance data may be received via the tuner/receiver 632 or receiver 644 or may be first sent to the TV equipment control circuitry 510 and then wirelessly transmitted to the portable electronic device via the communication device 654. The media guidance data downloaded to the portable electronic device is preferably scaled, parsed, or otherwise modified to accommodate the device's relatively smaller display screen.

Once media guidance data is received on one or more of the portable electronic devices, the data may be transmitted to and displayed on the display 512 of the television equipment 502. To do so, a communication link is first established between one of the portable electronic devices and the control circuitry 510 television equipment. A user may establish a link by pressing a "Link" button or other button or function on his or her portable electronic device. The user's ID and possibly other information may then be transmitted from the user's portable electronic device to the control circuitry 510 to identify the particular portable electronic device and its user.

Once a communication link has been established and the portable electronic device has been identified, at least some of the media guidance data for the portable electronic device may be displayed on the display 512. In one exemplary embodiment, this is done by transmitting the media guidance data from the portable electronic device to the control circuitry 510. Specifically, media guidance data stored in RAM 648 or ROM 650 of the portable electronic device is transmitted to the control circuitry where it is received by the decoder 616. The decoder 616 extracts the media guidance data and sends it to the A/V processor 608 for display on the display screen 512. The control circuitry may display the user's name or other ID, media content listings, a list of the user's favorite media content, a list of media content recorded by the user, or any other media guidance data or user information.

If the control circuitry 510 receives media guidance data from a portable electronic device that has not been set up with user information or other set-up information, it may only display the media guidance data for the device. The user may then enter user information or other set-up information while the media guidance data is displayed.

In another embodiment, the media guidance data for a portable electronic device may be stored in the control circuitry of the TV equipment rather than being transmitted from the portable electronic device. The media guidance data is retrieved and displayed on the display when the portable electronic device transmits user information or other start-up information to the control circuitry. For example, media guidance data for a portable electronic device identified by "XYZ" may be stored in the control circuitry and displayed when this portable electronic device establishes a communication link with the control circuitry.

The control circuitry 510 may also receive and display media guidance data or other information from several portable electronic devices at the same time. Scanning lines on the display 512 may be divided into several different areas, each of which is assigned to particular portable electronic devices or other devices. For example, as shown in FIG. 5, the display screen 512 may be divided into four display quadrants, with the upper right quadrant 514 being assigned to media content for the TV equipment 502 itself, the lower right quadrant 516 being assigned to media guidance data and/or media content for a first portable electronic device, the lower left quadrant 518 being assigned to media guidance data and/or media content for a second portable electronic device, and the upper left quadrant 520 being assigned to media guidance data and/or media content for a third portable electronic device. The four quadrants 514-520 are examples only, as the display screen 512 may be divided into any number of display areas limited only by the display's resolution.

Each quadrant or other screen area may be assigned to a user within a designated group such as a family. For example, the upper right quadrant 514 may be assigned to general family use for displaying media content and media guidance data received by the television equipment from a receiver or set-top box; the lower right quadrant 516 may be assigned to a father for receiving and displaying media content and/or media guidance data transmitted from the father's portable electronic device; the lower left quadrant 518 may be assigned to a mother for receiving and displaying media content and/or media guidance data transmitted from the mother's portable electronic device; and the upper left quadrant 520 may be assigned to a child for receiving and displaying media content and/or media guidance data transmitted from the child's portable electronic device.

The system 500 also permits several people to simultaneously watch their own media content or display their own media guidance data on the display without audio interference from other users. For example, the control circuitry 510 may simultaneously display three different media contents for three of the portable electronic devices as well as a media content for the TV equipment itself. The audio signals for the media contents of the portable electronic devices are not delivered to the large display's speakers but are instead transmitted to the speakers or earphones of the respective portable electronic devices. This permits the users to watch their personal media content and/or media guidance data on the large display while listening to any associated audio via their portable electronic device.

The system 500 also permits users of the portable electronic devices to share media guidance data. For example, a user of portable electronic device 504 may transmit media guidance data to the control circuitry 510 as described above. The user of another portable electronic device 506, or the user of portable electronic device 504, may then request that some or all of the media guidance data for portable electronic device 504 be transmitted from the control circuitry 510 to portable electronic device 506. This allows users to more easily share media guidance data such as lists of favorite programs, recommendations, reminders, etc.

The system 500 also permits users to use or edit their media guidance data, perform media guidance functions, and/or otherwise manipulate the media guidance data while it is displayed on the large display. The edited or otherwise altered media guidance data may then be transmitted back to the portable electronic device. This allows users to use, edit, or otherwise manipulate their media guidance data via the large display rather than the smaller displays of their portable electronic devices.

FIGS. 1, 5, 7, 8 and 9 illustrate display screens for an exemplary media guidance application function that may be performed on media guidance data for one of the portable electronic devices 504. Media guidance data is first transmitted from the portable electronic device 504 to the control circuitry 510. Alternatively, the data may be retrieved from memory of the control circuitry 510 upon receiving user information transmitted from the portable electronic device. A media guidance application at least partially implemented by the control circuitry 510 may use the media guidance data to display on the display 512 several media content listings such as those shown in FIG. 1.

The portable electronic device 504 may then be used to remotely control the control circuitry 510. For example, the user of the portable electronic device may select to record a media content represented by a listing by moving the highlight region 110 over the media content listing 108 and pressing a "Record" button on the portable electronic device.

Figure 7:
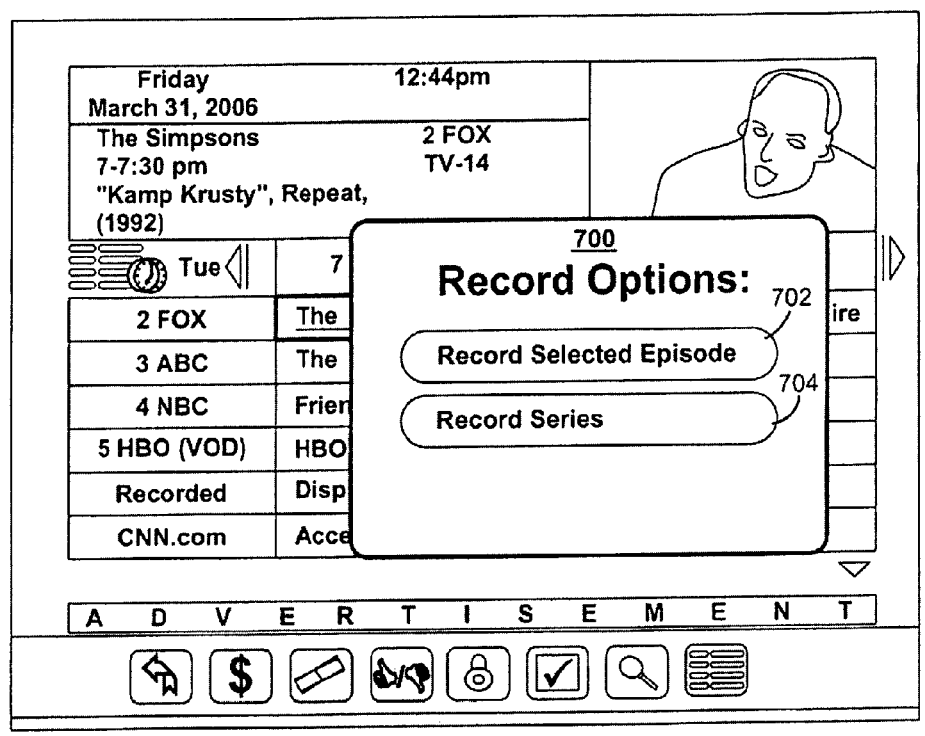
FIG. 7 is an illustrative display screen showing recording options on an overlay in accordance with an embodiment of the invention.

The media guidance application may then present on the display 512 a record options overlay 700 such as the one illustrated in FIG. 7. The record options overlay 700 may display a Record Selected Episode selection 702 and a Record Series selection 704. If the user picks selections 702 or 704, the media guidance application schedules recording of a single episode or a series in a conventional manner.

Figure 8:
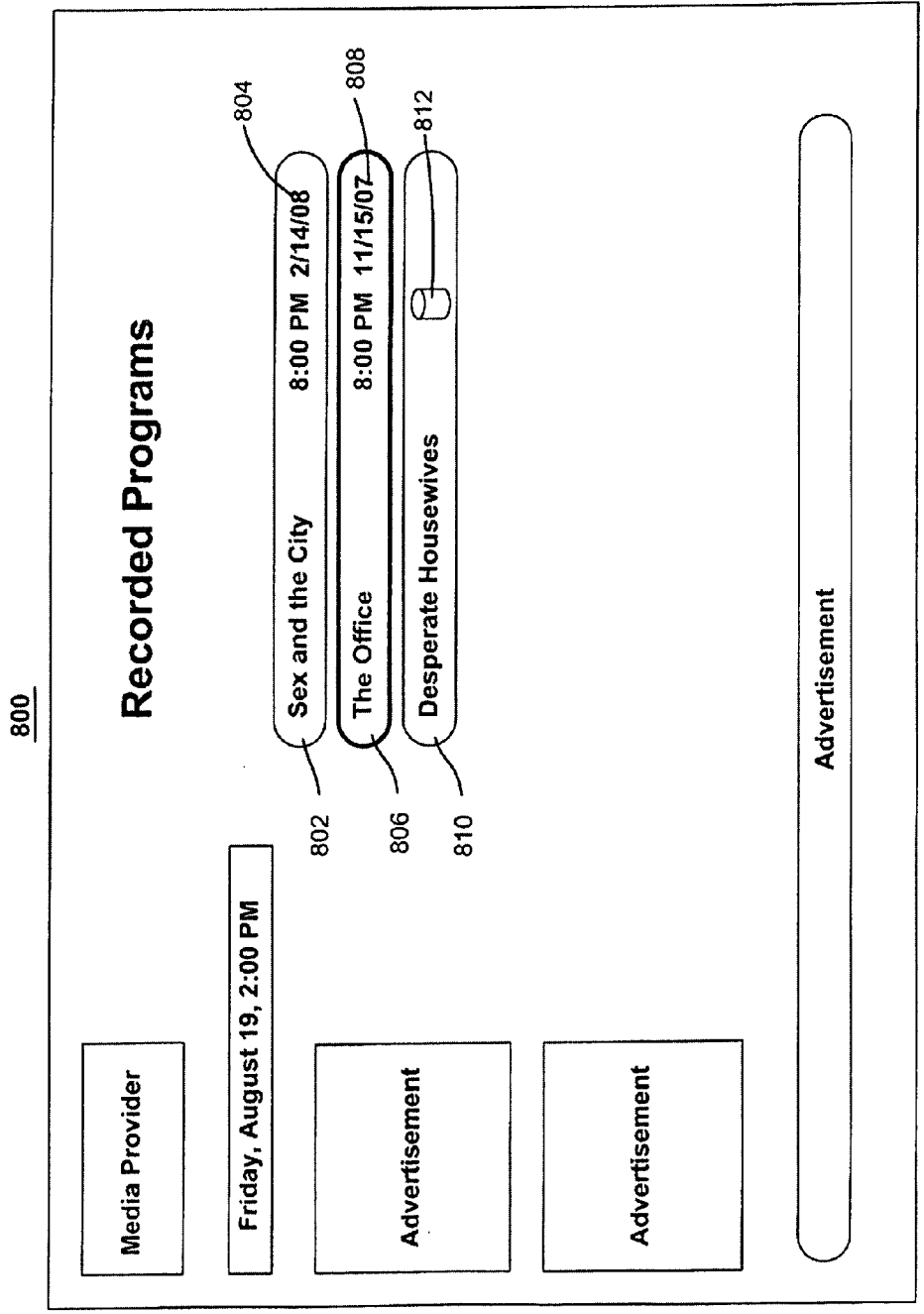
FIG. 8 is an illustrative display screen showing media content listings for media content that has been recorded or is scheduled for recording in accordance with an embodiment of the invention.

The user may later select to view the recorded media content by issuing a playback command from his or her portable electronic device. In response, the media guidance application may display a list 800 of all recorded media content as illustrated in FIG. 8. Previously recorded media content 802 and 806 may be displayed, for example, at the beginning of the list and be accompanied by the time and date 804 and 808 of the recording. Media content 810 scheduled to be recorded in the future may be displayed next and may be accompanied by an icon 812 that indicates the media content is scheduled for recording.

The user may request play-back of a recorded media content by highlighting a media content listing in the display 800 and then pressing "Enter" or another command on the portable electronic device. In response to the user request, the media guidance application issues a play-back request to either the local storage device 308 or a remote storage device.

The play-back request may include an identifier for the media content that the user wishes to play back and an identifier of the user. The play-back request may also include a pointer to a media directory on the local or remote storage device. The local or remote storage device then retrieves the requested media content and provides it to the user equipment device 300 as a suitable signal such as an NTSC video signal or an MPEG-2 video signal. The media content may be transferred to the user equipment device 300 in real time or in a compressed form such as a compressed video file.

The user may request deletion of a previously recorded media content by, for example, highlighting one of the media content listings in FIG. 8 and then pressing a "Delete" button on the portable electronic device. In response, the media guidance application may permit deleting of a single episode and deleting of an entire series.

Figure 9:
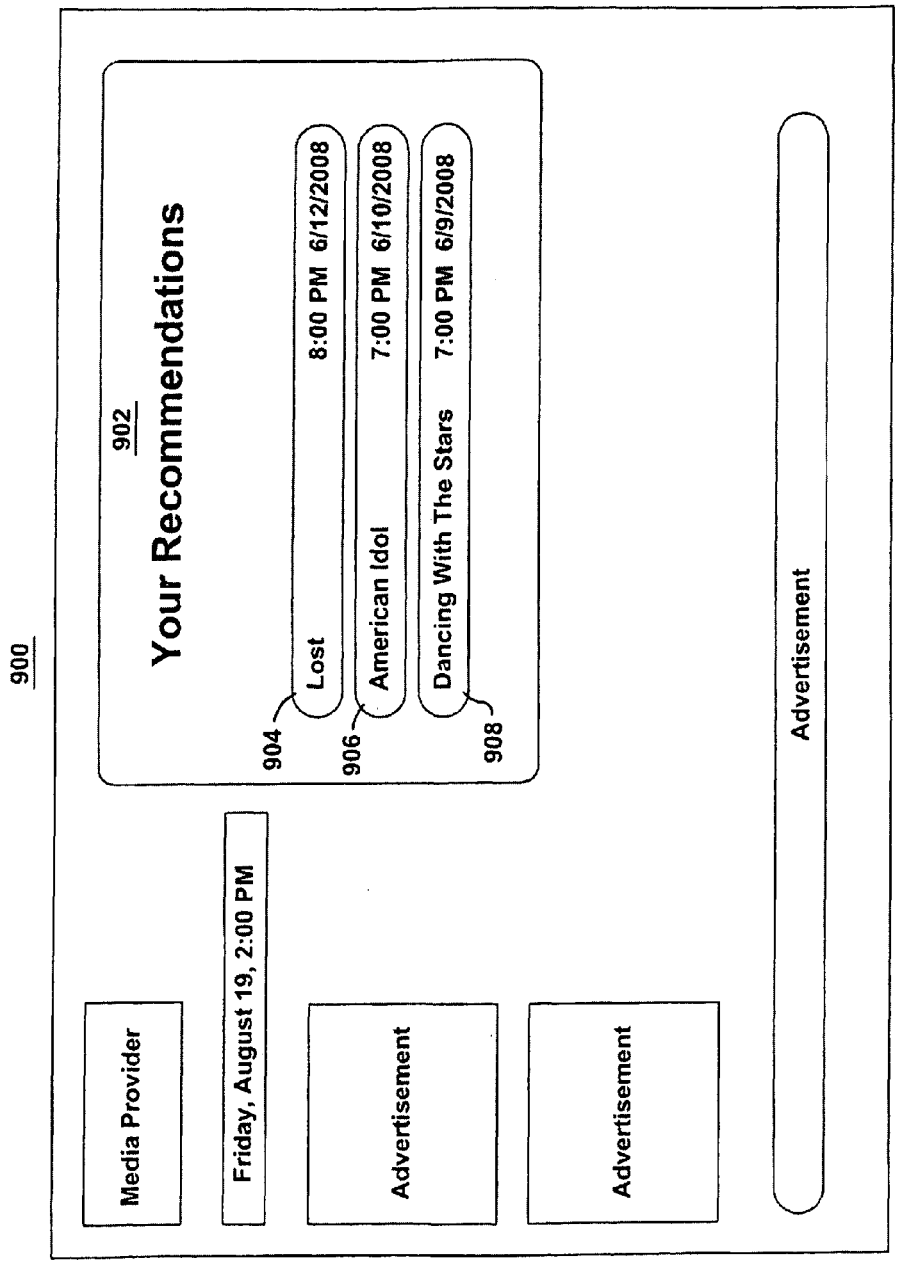
FIG. 9 is an illustrative display screen showing media content recommendations in accordance with an embodiment of the invention.

A user of one of the portable electronic devices may also obtain media content recommendations via the control circuitry 510. FIG. 9 illustrates an exemplary recommendations overlay 902 that may be displayed on the display 512 or otherwise conveyed to a user. The recommendations may be displayed only upon request, such as when the user operates his or her portable electronic device to request recommendations, or may be displayed automatically, for example when a user first establishes a communication link between his or her portable electronic device and the control circuitry 510. The recommendations overlay 902 may include a number of media content listings 904, 906, and 908 for recommended media content. A user may highlight any of the selections with the portable electronic device and then press "Enter" or other command on the portable electronic device to initiate a media guidance application function such as recording the media content, setting a reminder for the media content, or tuning the user equipment to the appropriate channel.

Each of the display screens in FIGS. 1, 2, and 7-9 may include a number of panel advertisements and banner advertisements. The size, shape, and location of the advertisements may be altered without departing from the spirit of the invention, and more or less advertisements than those shown may be displayed, if desired. The display screens of FIGS. 1, 2, and 7-9 are merely illustrative and may be replaced with any suitable display screen arrangements.

The system 500 also permits game players to display and play electronic games on the display 512 while other media content and/or media guidance data is displayed on other portions of the display. To do so, a user of a portable game player first establishes a communication link with the TV equipment as explained above. The control circuitry 510 recognizes the user information and identifies the device as a game player. The control circuitry may then follow protocols unique to portable game players. For example, the control circuitry may be configured so as not to suspend or otherwise interrupt an in-progress game with media content, media content alerts, etc. If a media content is scheduled for display while a game is being played on the display 512, the control circuitry 510 may display the media content and/or alert in a separate segment of the display so that the game player may continue playing the game without interruption.

The system 500 may also allow a portable electronic device user to more conveniently participate in a call-in program or game show. Most call-in programs or game shows require users to enter their names, ages, genders, addresses, telephone numbers, e-mail addresses, and other personal information. Entering all of this information with a portable electronic device is time-consuming and cumbersome. With the present invention, the user information entered during set-up of a portable electronic device as described above may be transmitted from the portable electronic device to the TV equipment and used for entry into a call-in program or game show.

Figure 10:
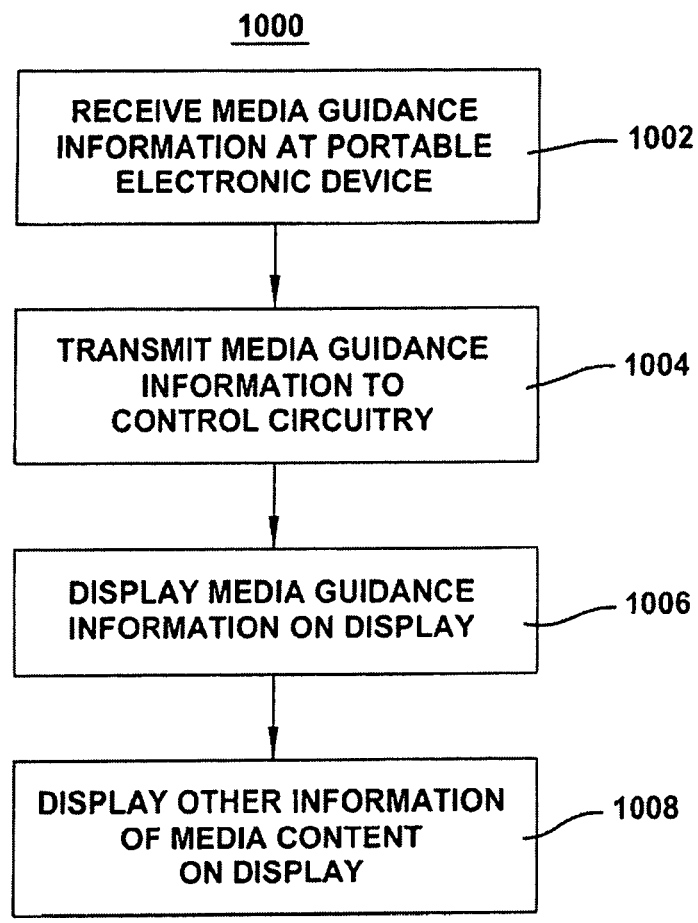
FIG. 10 shows an illustrative process for displaying media guidance information in accordance with an embodiment of the invention.

FIG. 10 shows an exemplary process 1000 for displaying media content and media guidance information in accordance with an exemplary embodiment of the invention. The particular order of the steps illustrated in FIG. 10 and described herein can be altered without departing from the scope of the invention. For example, some of the illustrated steps may be reversed, combined, or even removed entirely. At step 1002, one of the portable electronic devices receives media guidance information such as media guidance listings and/or other data. As discussed above, the portable electronic device may receive the media guidance information directly via its tuner/receiver 632 or receiver 644 or indirectly via the TV equipment.

At step 1004, the portable electronic device transmits at least some of the media guidance information to the control circuitry 510. Alternatively, the portable electronic device may only transmit certain user information or set-up information to the TV equipment and the TV equipment may retrieve the media guidance information for the portable electronic device from memory.

At step 1006, at least some of the media guidance information for the portable electronic device is displayed on the display 512. As discussed above, the media guidance information may be displayed on a segment of the display such as a quadrant of the display.

At step 1008, other information such as media content or media guidance information for other portable electronic devices or the TV equipment itself is displayed on the display 512 alongside the media guidance information for the portable electronic device.

Figure 11:
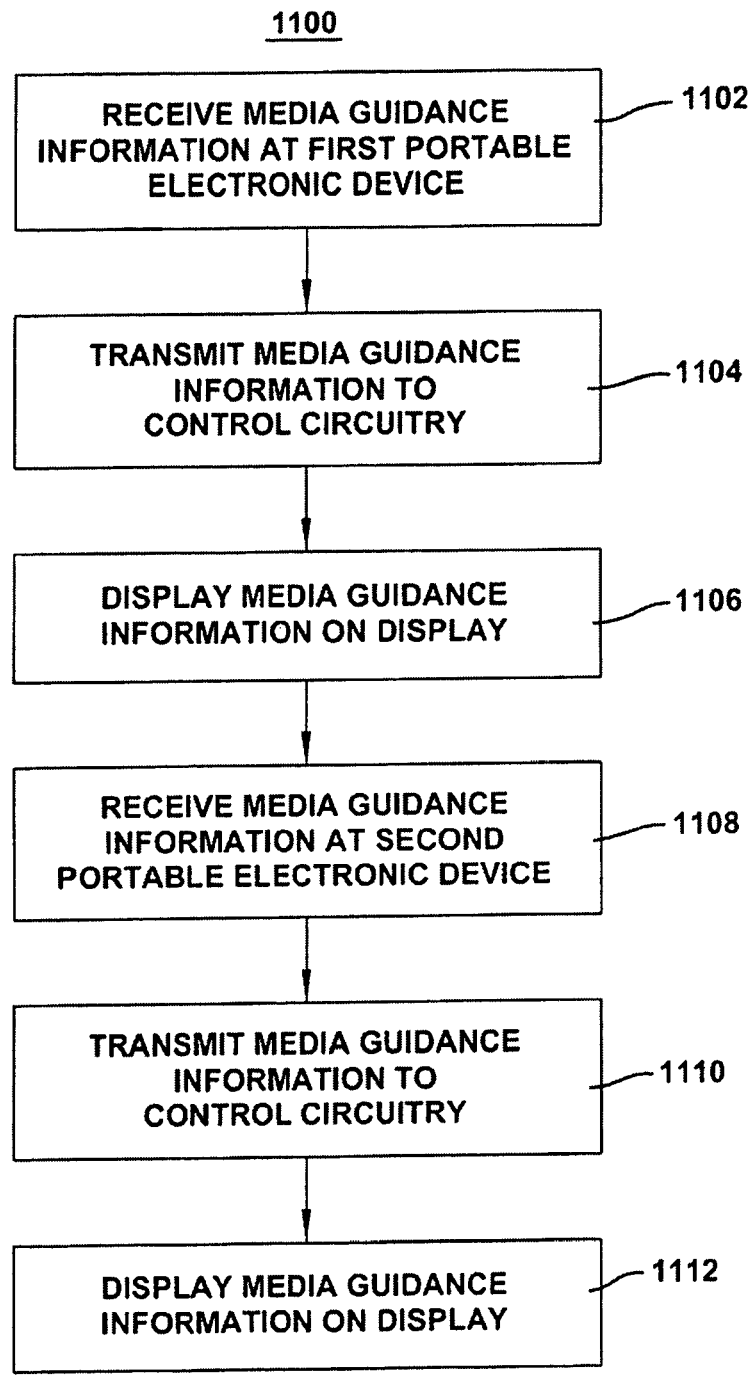
FIG. 11 shows another illustrative process for displaying media guidance information in accordance with an embodiment of the invention.

FIG. 11 shows another exemplary process 1100 for displaying media content and media guidance information. The particular order of the steps illustrated in FIG. 11 and described herein can be altered without departing from the scope of the invention. For example, some of the illustrated steps may be reversed, combined, or even removed entirely.

At step 1102, a first one of the portable electronic devices receives media guidance information such as media guidance listings and/or other data. The first portable electronic device may receive the media guidance information in any of the ways discussed above.

At step 1104, the first portable electronic device transmits at least some of the media guidance information to the control circuitry 510.
Alternatively, the first portable electronic device may only transmit user information or set-up information to the control circuitry and the control circuitry may retrieve the media guidance information from memory as described in more detail above.

At step 1106, at least some of the media guidance information for the first portable electronic device is displayed on the display 512. As discussed above, the media guidance information may be displayed on a quadrant or other segment of the display.

At step 1108, a second one of the portable electronic devices receives media guidance information such as media guidance listings and/or other data.

At step 1110, the second portable electronic device transmits at least some of the media guidance information to the control circuitry of the TV equipment. Alternatively, the second portable electronic device may only transmit user information or set-up information to the control circuitry and the control circuitry may retrieve the media guidance information from memory.

At step 1112, at least some of the media guidance information for the second portable electronic device is displayed on the display 512. As discussed above, the media guidance information may be displayed on a quadrant or other segment of the display.

Figure 12:
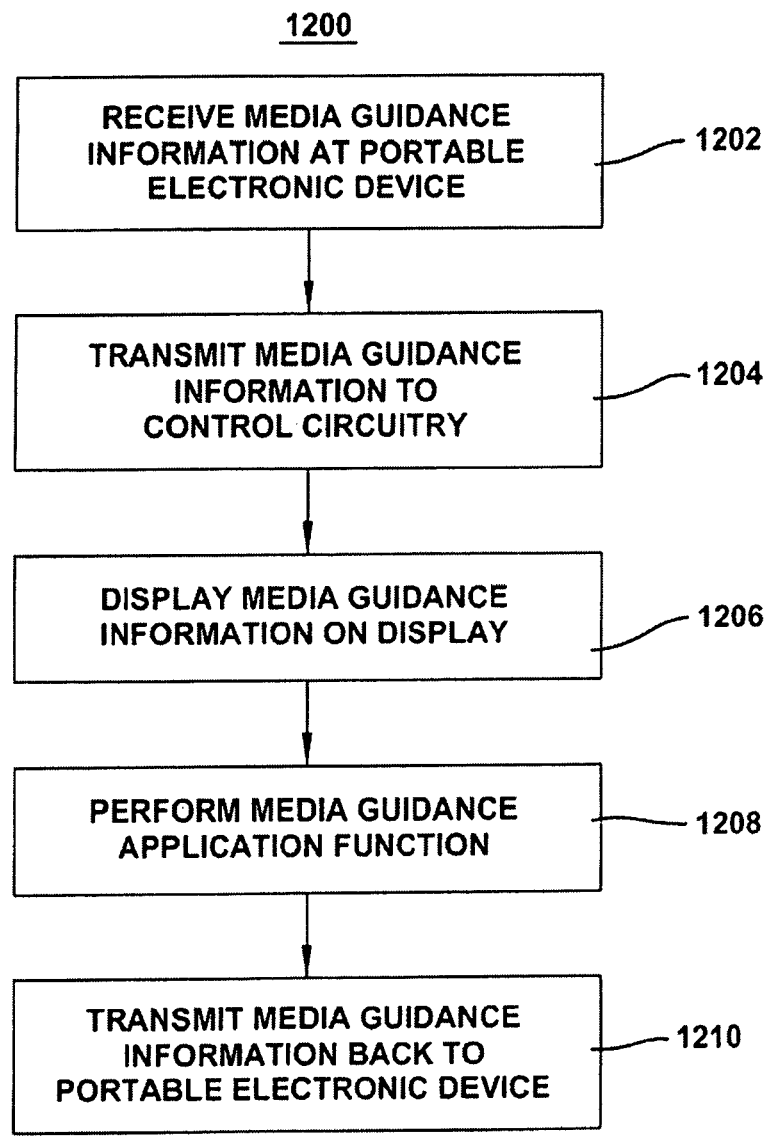
FIG. 12 shows another illustrative process for displaying media guidance information in accordance with an embodiment of the invention.

FIG. 12 shows another exemplary process 1200 for displaying media content and media guidance information. The particular order of the steps illustrated in FIG. 12 and described herein can be altered without departing from the scope of the invention. For example, some of the illustrated steps may be reversed, combined, or even removed entirely.

At step 1202, one of the portable electronic devices receives media guidance information such as media guidance listings and/or other data.

At step 1204, the portable electronic device transmits at least some of the media guidance information to the control circuitry of the TV equipment. Alternatively, the portable electronic device may only transmit certain user information or set-up information to the control circuitry and the control circuitry may retrieve the media guidance information for the portable electronic device from memory.

At step 1206, at least some of the media guidance information for the portable electronic device is displayed on the large display. As discussed above, the media guidance information may be displayed on a quadrant or other segment of the display.

At step 1208, a user of the portable electronic device may perform a media guidance application function with the media guidance information while it is displayed on the large display. For example, the user may use the media guidance information to navigate through the media content accessible by the portable electronic device, search for desired content, schedule a selected content to be recorded, record the selected content to a local storage device or remote media server, add the selected content to a favorite programs list, set a reminder for the selected content, order the selected content via an on-demand (e.g., video on-demand or VOD) or pay-per-view (PPV) service, or any other suitable function.

At step 1210, the media guidance information is then transmitted from the control circuitry back to the portable electronic device or to a different portable electronic device.

Although the invention has been described with reference to preferred embodiments illustrated and discussed herein, equivalents may be employed and substitutions made herein without departing from the scope of the invention as recited in the claims. For example, it will be appreciated that while the discussion of media content has focused on video content such as television programs, the principles of the present invention can be applied to other types of media content, such as music, images, etc. Moreover, the user equipment 300, system 400, and system 500 described and illustrated herein, as well as the individual components of the user equipment 300 and systems 400 and 500, are merely examples of systems, devices, and components that may be used to implement embodiments of the present invention and may be replaced with other systems, devices, and components without departing from the scope of the invention.

The invention claimed is:
1. A method for displaying media guidance information, the method comprising:
    transmitting media guidance information from a first portable electronic device to user equipment via a communication link, wherein the media guidance information received by the user equipment from the first portable electronic device is generated for simultaneous display, with the user equipment, with media content or media guidance information received by the user equipment from a source other than the first portable electronic device; and receiving an indication with the first portable electronic device that the media guidance information generated for display with the user equipment has been manipulated.

2. The method as set forth in claim 1, further comprising: transmitting media guidance information from a second portable electronic device to the user equipment; and generating for display the media guidance information from the second portable electronic device alongside the media guidance information from the first portable electronic device on the user equipment.

3. The method as set forth in claim 2, further comprising the step of transmitting from the user equipment at least some of the media guidance information received from the first portable electronic device to the second portable electronic device.

4. The method as set forth in claim 2, wherein the first and second portable electronic devices are mobile phones, portable computers, portable game players, portable navigation devices, portable televisions, or personal digital assistants.

5. The method as set forth in claim 1, further comprising: generating for display media guidance information received from a satellite or cable television provider alongside the media guidance information transmitted from the first portable electronic device on the user equipment.

6. The method as set forth in claim 1, further comprising: performing a media guidance application function with the media guidance information transmitted from the first portable electronic device while the media guidance information is generated for displayed with the user equipment; and after the media guidance application is performed, transmitting at least some of the media guidance information back to the first portable electronic device.

7. The method as set forth in claim 6, wherein the media guidance application function includes entering user information, searching for a desired media content, scheduling a selected media content for recording, recording a selected media content, deleting a previously recorded media content, adding a selected media content to a favorite media content list, setting a reminder for a selected media content, or ordering a selected media content via an on-demand or pay-per-view service.

8. The method as set forth in claim 1, wherein the user equipment comprises a set-top box.

9. The method as set forth in claim 1, wherein the user equipment executes an interactive media guidance application.

10. A system for displaying media guidance information, the system comprising:

a first portable electronic device comprising:
  a communication device for transmitting media guidance information to user equipment via a communication link, wherein the media guidance information received by the user equipment from the first portable electronic device is generated for simultaneous display, with the user equipment, with media content or media guidance information received by the user equipment from a source other than the first portable electronic device; and
  a receiver for receiving an indication that the media guidance information generated for display with the user equipment has been manipulated.

11. The system as set forth in claim 10, wherein the receiver comprises a digital receiver for receiving the media content from a mobile terrestrial digital broadcasting service.

12. The system as set forth in claim 11, wherein the receiver comprises a separate wireless mobile phone receiver for receiving the media guidance information from a phone network.

13. The system as set forth in claim 10, wherein the receiver is a single receiver that receives the media content and the media guidance information from a common signal.

14. The system as set forth in claim 10, wherein the communication device is a wireless local area network (LAN) transmitter or transceiver.

15. The system as set forth in claim 10, further comprising:
  a second portable electronic device including: a first receiver for receiving media content from a media content source; a second receiver for receiving media guidance information from a media guidance source; and a communication device for transmitting at least some of the media guidance information to the user equipment for generating a simultaneous display with the media guidance information from the first portable electronic device.

16. The system as set forth in claim 15, wherein the first and second portable electronic devices are mobile phones, portable computers, portable game players, portable navigation devices, portable televisions, or personal digital assistants.

17. The system as set forth in claim 10, wherein the first portable electronic device is operable for performing a media guidance application function with the media guidance information while the media guidance information is displayed on the display.

18. The system as set forth in claim 17, wherein the media guidance application function includes entering user information, searching for a desired media content, scheduling a selected media content for recording, recording a selected media content, deleting a previously recorded media content, adding a selected media content to a favorite media content list, setting a reminder for a selected media content, or ordering a selected media content via an on-demand or pay-per-view service.

19. The system as set forth in claim 10, wherein the user equipment comprises a set-top box.

20. The system as set forth in claim 10, wherein the user equipment executes an interactive media guidance application.

* * * * *